May 29, 1962 W. E. JOHNSON 3,036,745
APPARATUS FOR INDUCING THE FLOW OF PULVERIZED MATERIAL
Filed March 30, 1960 2 Sheets-Sheet 1

INVENTOR
WALTER E. JOHNSON
BY
Ernest G. Johnson
ATTORNEY

May 29, 1962 W. E. JOHNSON 3,036,745
APPARATUS FOR INDUCING THE FLOW OF PULVERIZED MATERIAL
Filed March 30, 1960 2 Sheets-Sheet 2

INVENTOR
WALTER E. JOHNSON
BY
ATTORNEY 3,036,745
**APPARATUS FOR INDUCING THE FLOW
OF PULVERIZED MATERIAL**
Walter E. Johnson, 104 Boyle Ave., Paterson 2, N.J.
Filed Mar. 30, 1960, Ser. No. 18,595
5 Claims. (Cl. 222—411)

The present invention relates to conveying pulverized material, and, more particularly, to an apparatus for feeding and deaerating finely pulverized materials which are fluent but usually are not free flowing under the influence of gravity alone.

In many material processing industries, finely pulverized materials are conveyed from one location to another within the plant by pneumatic conveyors of the type which include a tube under pneumatic pressure for delivering the material to a hopper or bin from which the material is withdrawn for packaging or further processing the same.

Heretofore, considerable difficulty has been encountered in controlling the flow of the material from such a hopper or bin so that it is delivered at a uniform rate. Another difficulty is that air from the pneumatic conveyor system is entrapped non-uniformly and unpredictably in the material, whereby the apparent density of the material varies over an extremely wide range. This introduces further difficulties, one being that automatic packaging machines cannot be timed to package a given volume having a constant weight, and a second being that air is entrapped in the package which may lead to further difficulties when attempting to close the package or handling the same after being closed.

Accordingly, an object of the present invention is to provide apparatus for inducing the flow of such materials which may have air entrapped therein at a uniform volumetric and weight-wise rate.

Another object is to provide such apparatus which will deaerate the material to adjust the apparent density thereof to a predetermined value.

Another object is to provide such apparatus which can be utilized to uniformly blend two or more different materials each being delivered from a separate hopper.

A further object is to accomplish the foregoing in a simple, practical and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

Figure 1:
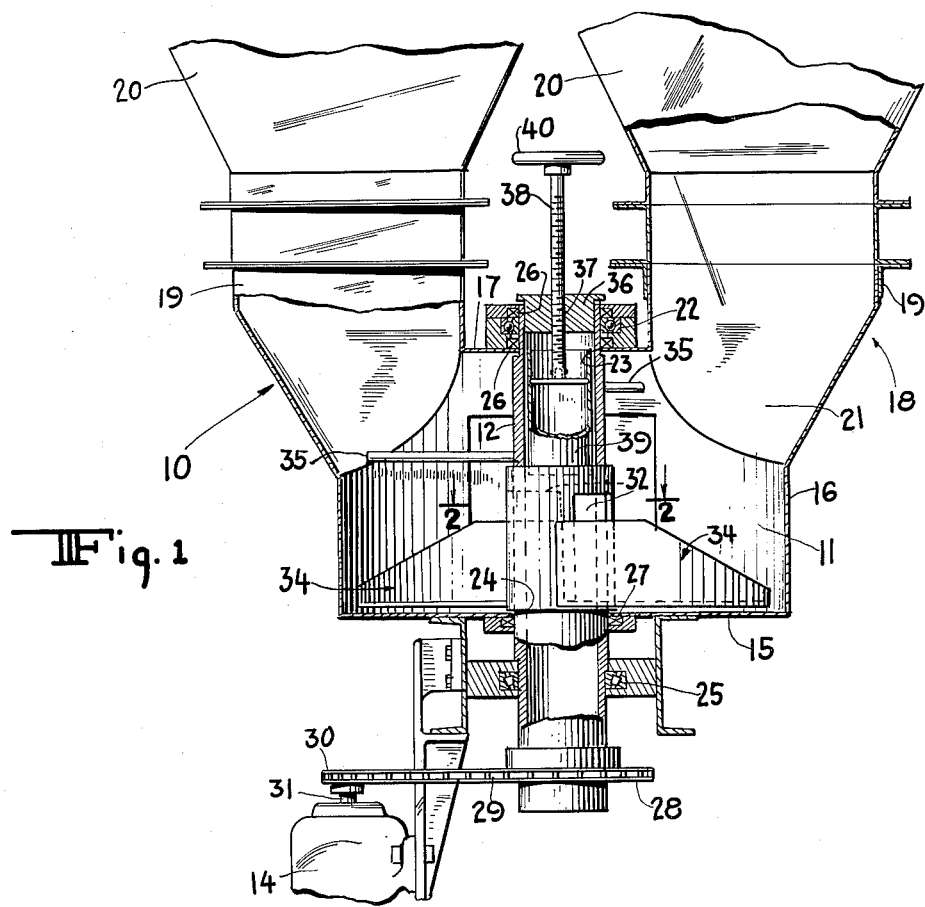
FIG. 1 is a longitudinal sectional view of one form of apparatus in accordance with the present invention.
Figure 2:
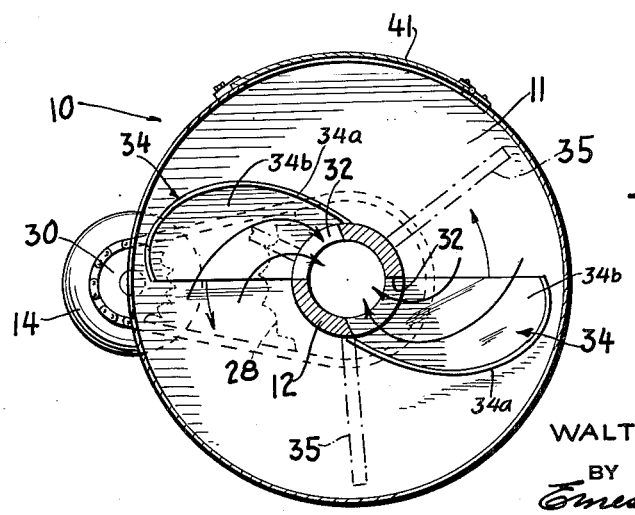
FIG. 2 is a sectional view taken along the line 2—2 on FIG. 1.

Referring in detail to FIGS. 1 and 2 of the drawings, there is shown apparatus which generally comprises a casing 10 providing an agitation chamber 11 for pulverized material, a material delivery tube 12 having agitator means thereon positioned within the chamber, and a motor 14 for driving the apparatus.

The casing 10 comprises a flat horizontal bottom wall 15, an annular side wall 16 and a top wall 17. The top and side walls have structure 18 formed with a collar 19 having an opening for receiving the discharge end of a hopper 20 and contoured at 21 to deliver the material towards the bottom of the chamber from the hopper. For purposes of illustration, the casing 10 is shown with two opposite hopper mounting structures 18, although in some instances a single structure or more than two spaced structures 18 may be provided if desired.

When provision is made for delivering material from two or more hoppers, the material in each hopper may be the same or different. If different materials are to be so delivered, the apparatus may be utilized to blend and admix such materials while still controlling the individual and collective flow rate thereof.

The material delivery tube 12 is journalled for rotation at its upper end in a bearing 22 secured to the top wall of the casing about a central opening 23 through which the tube extends, the lower end of the tube extending through a central opening 24 in the bottom wall of the casing, and the tube being rotatably supported by a thrust bearing 25 suspended from the bottom wall 15. Sealing glands 26 and 27 are respectively provided at the openings 23 and 24 to confine finely pulverized material within the chamber 11.

The lower end of the tube 12 has a sprocket 28 secured thereon beneath the thrust bearing 25 which is connected by a chain 29 to a sprocket 30 on the drive shaft 31 of the motor 14 or an output shaft of a motor driven gear box, whereby rotation of the tube is effected.

The portion of the tube 12 within the chamber 11 is formed with a pair of diametrically opposite slots 32 for delivering material from the chamber into the tube so that the material is discharged from the lower end opening of the tube into another receptacle for packaging or further processing the same.

The agitator means to which general reference was made hereinbefore include a pair of vanes 34 each having a substantially vertical material moving portion 34a with the bottom thereof closely adjacent the bottom wall 15 and each of which has a configuration for directing the material radially inwardly towards the slots 32 and upwardly thereby imparting a vortex action to the column of material within the chamber. The vanes 34 are unobstructed at the upper edge thereof to generate this vortex action, and, as shown herein, the vanes may have a substantially horizontal bottom portion 34b extending forwardly of the vertical portion and positioned to move closely across the flat bottom 15 and scoop up the material whereby the vortex action produced by the vertical vane portions is enchanced. The vertical portion 34a of each vane commences at about the trailing edge of its slot and extends outwardly and forwardly towards side wall 15 of the casing 10 to about a vertical plane intersecting the axis of rotation of the tube 12 and the leading edge of its slot. As shown herein, the vertical vane portions 34a may be curved, and may decrease in height as they extend outwardly. The vanes 34 are positioned diametrically opposite each other and halfway between the slots 32 and are secured to the tube for rotation therewith. Preferably, the slots extend from adjacent the bottom wall to above the vanes 34 and have a circumferential extent of about 90° (FIG. 2). The agitator means further include a plurality of radial blades or arms 35 in the chamber mounted on the tube 12 at spaced levels above the vanes and spaced circumferentially apart about 120° to provide for agitation of the material within the chamber above the slots 32 and just beneath the collar 19.

As a specific example, in apparatus wherein the casing 10 has a diameter of about two feet at the bottom 15 thereof, the tube 12 has an inside diameter of about four inches and the vertical portions of the vanes 34 have a height of about four inches adjacent the tube 12, the slots 32 extend above the upper edges of the vanes between one-half and one inch. In a casing and tube arrangement so dimensioned, the two slots 32 have a combined area of about 9 pi to 10 pi square inches, and the annular bottom wall 15 of the casing which surrounds the tube has an area of about 140 pi square inches, whereby this area of the bottom wall is about 14 to 16 times greater than the combined area of the slots 32 when the slots are fully open. With such an arrangement an effective whirlpool is created in a column of material equivalent in height to about three and one-half times the diameter of the base of the chamber, while rotating the tube about 90 revolutions a minute. While so feeding pulverized clay at a rate of about 7200 pounds an hour for four hours and testing the delivered material every five minutes, it was found that the apparent density of the material and its delivery rate on a weight basis remained constant and uniform throughout the entire test period.

In order to control the rate of flow of material through the slots 32, suitable manually or mechanically operable valve means are provided for changing the effective opening area of the slots or completely closing the same. As shown herein, such means may comprise a plug 36 screw threaded into the upper end of the tube 12 to provide a closure therefor and having a threaded central bore 37, a threaded rod 38 extending through the bore 37, a cylindrical tube 39 telescoped within the tube 12 and secured to the lower end of the rod 38, and a handle 40 on the upper end of the rod 38, whereby turning of the rod raises or lowers the tube 39 between fully closed and fully open positions with respect to the slots. Thus by decreasing the flow rate of the material through the slots 32, the material passing through the casing 10 within a given interval of time is more effectively deaerated.

Also, in order to provide for access to the chamber 11 to clean or repair parts therein, the casing 10 has a removable side door 41 in the wall 16.

Figures 3, 4:
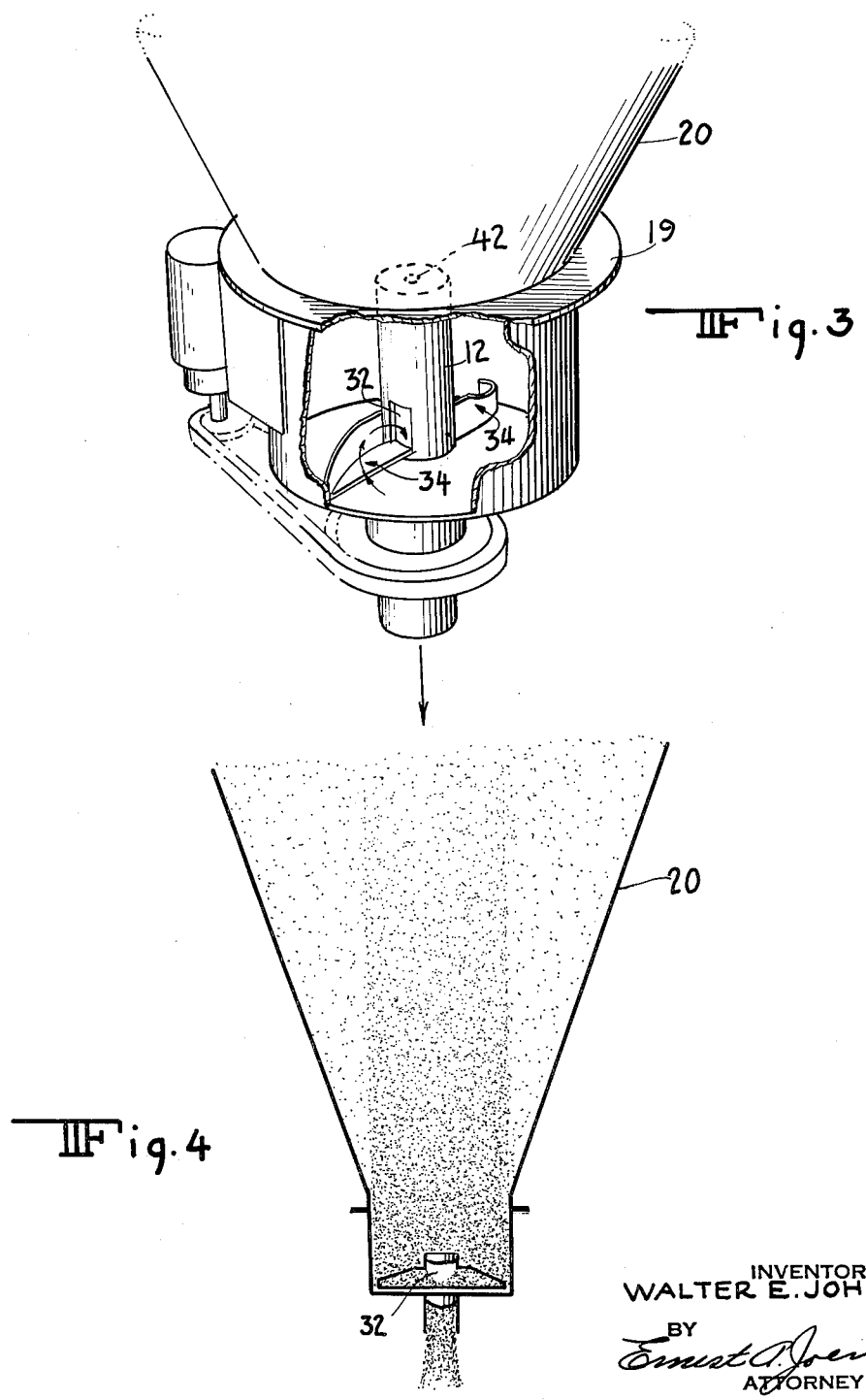
FIG. 3 is a longitudinal sectional view of another form of apparatus in accordance with the present invention.
FIG. 4 is a schematic illustration of the manner in which a column of material in a bin or hopper is affected by agitation from the apparatus shown herein.

In FIG. 3, wherein like parts are indicated by like reference numerals already applied, apparatus is shown which differs from the apparatus shown in FIGS. 1 and 2 only in that the collar 19 for the hopper 20 is concentric with the tube 12, the tube 12 being closed at the top thereof except for a vent 42 to relieve trapped air. Although not shown in this view, an arrangement can be provided for varying the effective opening area of the slots and for cutting off flow instantaneously. The tube 12 shown in FIG. 1 could likewise be provided with a vent 42 by forming the same in the plug 36.

In FIG. 4, a column of pulverized material is shown schematically in a hopper 20 to illustrate the zone in which agitation with a whirlpool effect takes place to deaerate air entrapped in the material. The increasing darkness of the material from top to bottom indicates the degree of effectiveness of deaeration at any particular point in the zone, and demonstrates that by the time the material is induced to flow into the opening 32 complete deaeration has been accomplished.

The apparatus shown herein is adapted for, but not limited to, feeding numerous pulverized materials such as asbestos, rubber accelerators, pigments, clays, carbon black, talc, cement, dried food products, cocoa, starch, sawdust, fluor and numerous other organic and inorganic chemicals in powder form.

From the foregoing description, it will be seen that the present invention provides simple, practical and economical apparatus for feeding pulverized materials with which difficulties have heretofore been encountered. The apparatus is relatively small and compact for its flow capacity, is sturdy in construction and not likely to be damaged, and is practically self cleaning but can be readily cleaned before changing over from one material to another.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

This application is directed to an improvement over the structure disclosed in my prior application for Letters Patent of the United States, Serial No. 833,283, filed August 12, 1959, now abandoned.

I claim:

1. In apparatus for inducing the flow of pulverized material having air entrapped therein and for deaerating the material, the combination of a casing providing a chamber for containing the material, said chamber having an upright side wall and having a substantially flat horizontal bottom wall formed with an opening, an upright tube in said chamber extending through said opening, said tube having a plurality of substantially equidistantly circumferentially spaced slots in the side wall thereof, said slots having a circumferential extent about equal to the distance between the leading and trailing edges of adjacent slots and extending upwardly from said bottom wall, means for rotatably mounting said tube, means for rotating said tube, and a plurality of vanes corresponding in number to the number of slots and being mounted for rotation with said tube, each vane having a substantially vertical portion commencing at about the trailing edge of a slot and extending outwardly and forwardly towards said side wall to about a vertical plane intersecting the axis of rotation of said tube and the leading edge of the aforementioned slot, said vanes having a horizontal lower edge portion for moving in a path closely adjacent and across said bottom wall and having an upright portion of slightly lesser height than said slots and of greater length than the diameter of said tube, whereby said vanes have a configuration for directing the material upwardly from said bottom wall to effect deaeration of the material within said chamber and for directing the material inwardly towards said slots to effect discharge of the material therethrough and into said tube.

2. In apparatus according to claim 1, wherein two diametrically opposite slots and two vanes are provided.

3. In apparatus according to claim 1, wherein said lower edge portion of said vanes is a substantially flat horizontal portion extending forwardly of said vertical portion between the inner and outer ends of said vertical portion for scooping the material upwardly from said bottom wall.

4. In apparatus according to claim 1, wherein valve means are provided for varying the effective area of said slots to vary the deaerating effectiveness of said apparatus.

5. In apparatus according to claim 4, wherein said valve means include a tube telescopically mounted within said first tube above and adjacent said slots, and means for positioning said tube vertically with respect to said slots to at least partially close said slots from the upper end thereof.

References Cited in the file of this patent

UNITED STATES PATENTS

| | | |
|---|---|---|
| 555,896 | Crane | Mar. 3, 1896 |
| 735,281 | Mitchell et al. | Aug. 4, 1903 |
| 1,154,433 | Reece | Sept. 21, 1915 |
| 1,233,791 | Kaiser | July 17, 1917 |
| 1,457,230 | Roubique | May 29, 1923 |
| 2,601,534 | Laffoon | June 24, 1952 |
| 2,626,210 | Schlepper | Jan. 20, 1953 |
| 2,674,396 | Peterson | Apr. 6, 1954 |

FOREIGN PATENTS

| | | |
|---|---|---|
| 291,587 | Italy | Dec. 21, 1931 |
| 855,677 | Germany | Nov. 13, 1952 |